United States Patent [19]

Yamaguchi

[11] 4,377,996

[45] Mar. 29, 1983

[54] IGNITION TIMING CONTROL METHOD AND SYSTEM

[75] Inventor: Hiroshi Yamaguchi, Yokosuka, Japan

[73] Assignee: Nissan Motor Co., Ltd., Yokohama, Japan

[21] Appl. No.: 233,650

[22] Filed: Feb. 11, 1981

[30] Foreign Application Priority Data

Feb. 12, 1980 [JP] Japan .................................. 55-14736

[51] Int. Cl.³ .............................................. F02P 5/04
[52] U.S. Cl. .................................... 123/416; 123/417; 123/146.5 A
[58] Field of Search ......... 123/414, 416, 417, 146.5 A

[56] References Cited

U.S. PATENT DOCUMENTS

| | | |
|---|---|---|
| 3,898,894 | 8/1975 | Aono et al. |
| 4,225,925 | 9/1980 | Hattori et al. |
| 4,245,591 | 1/1981 | Nishida et al. ........................ 123/416 |
| 4,258,684 | 3/1981 | Shira ..................................... 123/416 |
| 4,266,518 | 5/1981 | Nishida et al. ........................ 123/416 |
| 4,292,941 | 10/1981 | Suzuki .................................. 123/417 |

FOREIGN PATENT DOCUMENTS

| | | |
|---|---|---|
| 2357701 | 6/1974 | Fed. Rep. of Germany . |
| 2801641 | 7/1978 | Fed. Rep. of Germany . |
| 2805293 | 8/1978 | Fed. Rep. of Germany . |
| 2813574 | 10/1978 | Fed. Rep. of Germany . |
| 2845024 | 5/1979 | Fed. Rep. of Germany ...... 123/416 |
| 54-103928 | 8/1979 | Japan ................................... 123/416 |

*Primary Examiner*—P. S. Lall
*Attorney, Agent, or Firm*—Lowe, King, Price & Becker

[57] ABSTRACT

An ignition timing control for an internal combustion engine is performed by measuring engine operating variables to estimate the engine operating conditions and determining an optimal ignition timing depending upon the measured engine operating variables. The thus determined ignition timing is subject to two limitations to limit the amount of ignition timing change to be within a predetermined range, thereby to prevent an abrupt change of ignition timing even when the engine operating conditions change from one state to another. The ignition timing may be further limited to limit the amount of ignition timing change toward a spark advance during an initial period of acceleration.

11 Claims, 5 Drawing Figures

IGNITION TIMING CONTROL METHOD AND SYSTEM

BACKGROUND OF THE INVENTION

1. Field of the Invention

The present invention relates generally to ignition timing control methods and systems for an internal combustion engine, and more specifically to such a method or system which is arranged to provide improved driveability and stable operation especially when the engine operating conditions are rapidly changing, and to alleviate uncomfortable shock inherent in acceleration.

2. Description of the Prior Art

Among recent advances in automotive electronics is an electronic ignition timing control system in which ignition timing (spark advance or retard) is determined, using a data processing device such as a microcomputer, depending upon engine operating variables such as engine speed and engine load. Such an electronic ignition timing control system provides a wide flexibility of control and affords an optimal ignition timing adapted to the engine operating conditions, compared with a conventional mechanical ignition control device such as a centrifugal advance mechanism and a vacuum advance mechanism.

However, such an electronic ignition timing control system determines the ignition timing depending upon the engine operating conditions by performing a calculation and, therefore, the resulting ignition timing changes abruptly and discontinuously when the engine operating conditions are changing from one state to another. This is true especially in an electronic ignition timing control system using several ignition timing tables each prepared for one of several divided categories of the engine operating conditions. For example, (1) during a cranking period, ignition timing is determined by selecting a proper value from a table containing a collection of ignition timing values as a function of engine coolant temperature, (2) when a throttle switch for detecting a throttle position is in its on position (i.e. the throttle valve is fully closed), ignition timing is determined depending upon engine speed from another table, and (3) during normal operations, the ignition timing is selected from still another table containing ignition timing values as a function of engine speed and engine load which is detected from intake vacuum, incoming air quantity or width of fuel injector pulses. In such a system, the specific ignition timing table to be applied is replaced by a different table when the engine operating conditions change from one state to another among the states (1) to (3), which leads to a discontinuous change of ignition timing. A sudden, abrupt change of ignition timing causes an abrupt or violent change of the engine output torque, thus deteriorating the driveability and also causing unstable variation of dwell angle, making the length of time current can flow through the ignition coil too long or too short. If the current flows for too long of time, a power transistor is often damaged, and, if the current flows for an insufficient time, insufficient ignition energy supply induces misfire and backfire. Furthermore, just after starting of acceleration when the throttle valve begins to open from its fully closed position, ignition timing changes greatly and rapidly in a spark advance direction to follow the change of the engine operating conditions. Consequently, the engine output torque suddenly increases, presenting uncomfortable shocks and vibrations.

SUMMARY OF THE INVENTION

It is therefore an object of the present invention to provide an ignition timing control method and system which are arranged to prevent a violent change of ignition timing by limiting the amount of ignition timing change to be within a predetermined range, and thus to improve the engine driveability and the engine operation stability.

It is another object of the present invention to provide an ignition timing control method and system which are arranged to alleviate shocks inherent in a transition period from deceleration to acceleration by limiting the amount of ignition timing change to be within a predetermined range.

According to the present invention, the ignition timing control for an internal combustion engine is performed by measuring engine operating variables to estimate the engine operating conditions, determing an optimal ignition timing as a basic value depending on the measured engine operating variables, and executing engine ignition in accordance with the ignition timing which is set to the basic value. The basic value is limited under special conditions to limit the amount of ignition timing change by storing an ignition timing value used in the last time interval as a previous value, comparing the basic value with the previous value to find a difference therebetween, limiting the basic value, if the difference is beyond a first predetermined range, in such a manner that the difference is kept within said first predetermined range, and setting an ignition timing to be used in the present time interval to the basic value which is limited, if required. The basic value may be further limited, if the difference is beyond a second predetermined range which is narrower than the first predetermined range, to limit the amount of ignition timing change toward a spark advance in such a manner that the difference is kept within the second predetermined range, during a limited time interval from a position change of a throttle valve for the engine from its fully closed position to its open positions.

DESCRIPTION OF THE PREFERRED EMBODIMENTS

Figure 1:
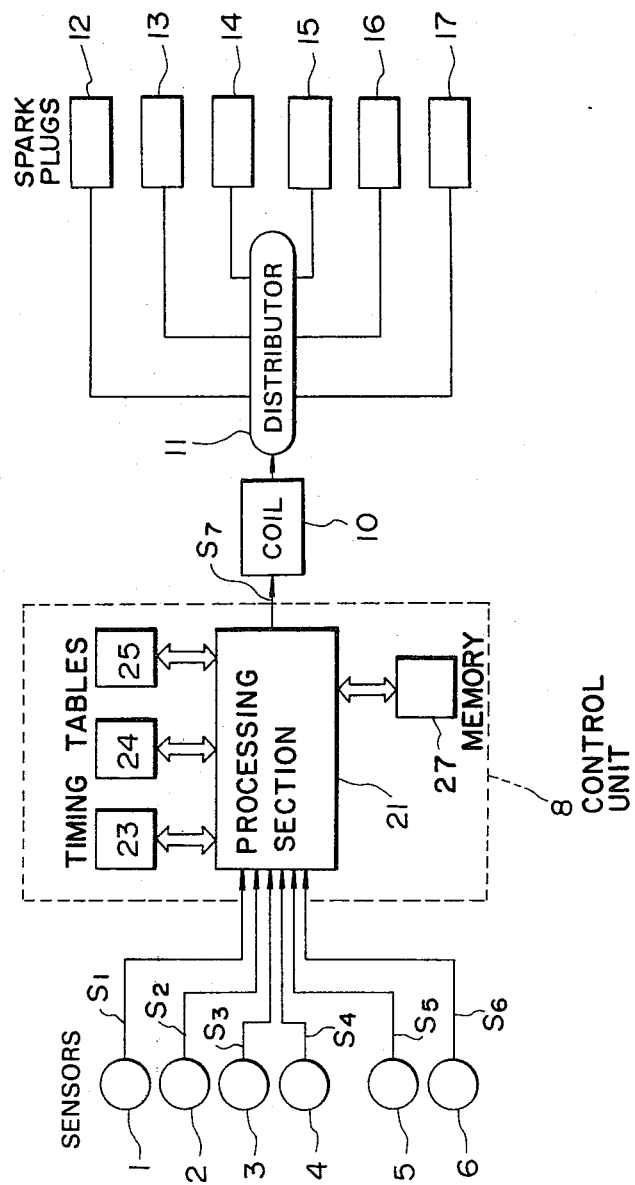
FIG. 1 is a schematic illustration showing an example of the ignition timing control system used in the present invention.

In FIG. 1, an ignition timing control system comprises a plurality of sensors 1 to 6 to measure engine conditions, a control unit 8 for processing sensor information, which generally includes a microcomputer, and an ignition executing system which comprises an ignition coil 10, a distributor 11 and several spark plugs 12 to 17.

The sensors 1 to 6 include an engine speed sensor 1 for producing a signal S1 indicative of engine RPM, a vacuum sensor 2 producing a signal S2 indicative of intake manifold vacuum, a temperature sensor 3 for producing a signal S3 indicative of engine coolant temperature, a throttle switch 4 for detecting a fully closed position of a throttle valve to produce a signal S4, a reference angular position sensor 5 for producing a reference angular position pulse signal S5 for every predetermined angle of crankshaft rotation (for example, 120°), and an angular position sensor 6 for producing an angular position pulse signal S6 each indicating a unit (1°, for example) of crank angle. If appropriate, there may be further provided additional sensors for supplying to the control unit 8 such information as the conditions of fuel injection, the position of a transmission, and the vehicle speed.

Figure 2:
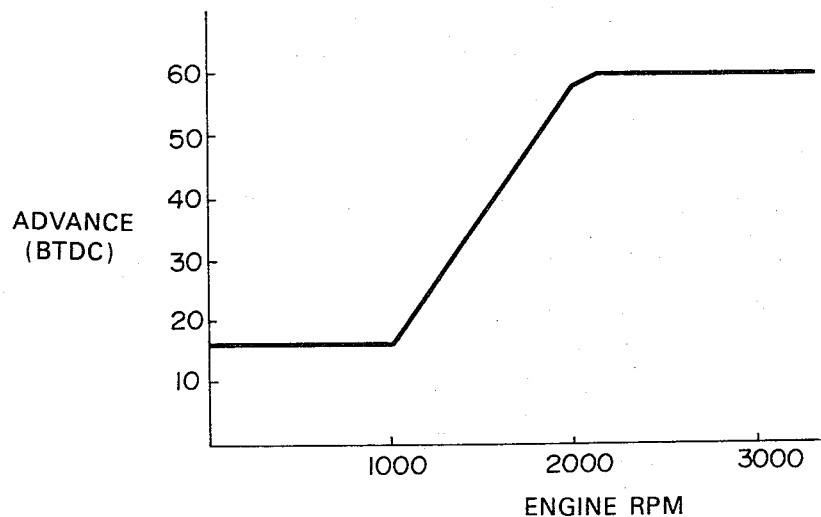
FIGS. 2 and 3 are diagrams showing examples of the relations between the ignition timing and the engine operating variables, used in the present invention.
Figure 3:
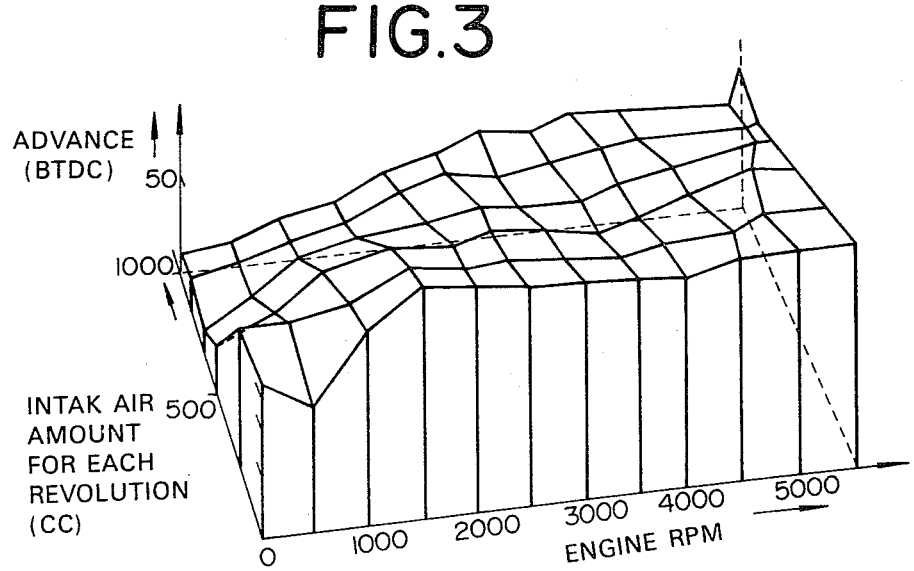

In the control unit or microcomputer 8, a processing section 21 receives the sensor output signals S1 to S6 and determines a basic value for ignition timing in accordance with the engine operating conditions. The basic value is determined by executing a calculation or selecting a value corresponding to a given point of the engine operating conditions from a collection of values for ignition timing. The particular timing values are stored in the microcomputer 8 in the form of tables 23 to 25 each of which is prepared for one of different categories of the engine operating conditions. For example, the ignition timing is selected from a table in which advance angles are stored as a function of engine RPM (hereinafter referred to as a first characteristic relation), as shown in FIG. 2, when the throttle valve is fully closed, and from another table in which advance angles are stored as a function of intake air quantity and engine RPM (hereinafter refered to as a second characteristic relation), as shown in FIG. 3, when the throttle valve is not fully closed. Then, the processing section 21 compares the present basic value determined in this way with a previous value of ignition timing stored in memory 27, to find the difference therebetween. If the difference is within a first predetermined range (for example, within ±10°), then the basic value is directly delivered as an ignition timing to be used this time. If the difference is beyond the first predetermined range, the ignition timing is set at an upper limit value of the range (in the case of a spark advance) or at a lower limit value (in the case of a spark retard). Furthermore, the amount of ignition timing change toward a spark advance is limited to be within a second predetermined range (for example, about 1° to 5°) which is narrower than the first predetermined range, for a predetermined period of time from the time when the throttle valve is opened from its fully closed position or until the end of a predetermined number of engine crankshaft rotations. The first and second ranges may be constant or may be variable depending on the difference between the present basic value and the previous value. An output firing signal S7 is delivered when the number of angular position pulse signals applied by the angular position sensor 6 to the control unit 8, since the last occurrence of the reference angular position pulse signal, reaches the number corresponding to the thus determined ignition timing.

The connection of the primary circuit of the ignition coil 10 is made and broken in response to the firing signal S7 and a high tension current produced by the ignition coil is distributed by the distributor 11 to the respective spark plugs 12 to 17.

Figure 4:
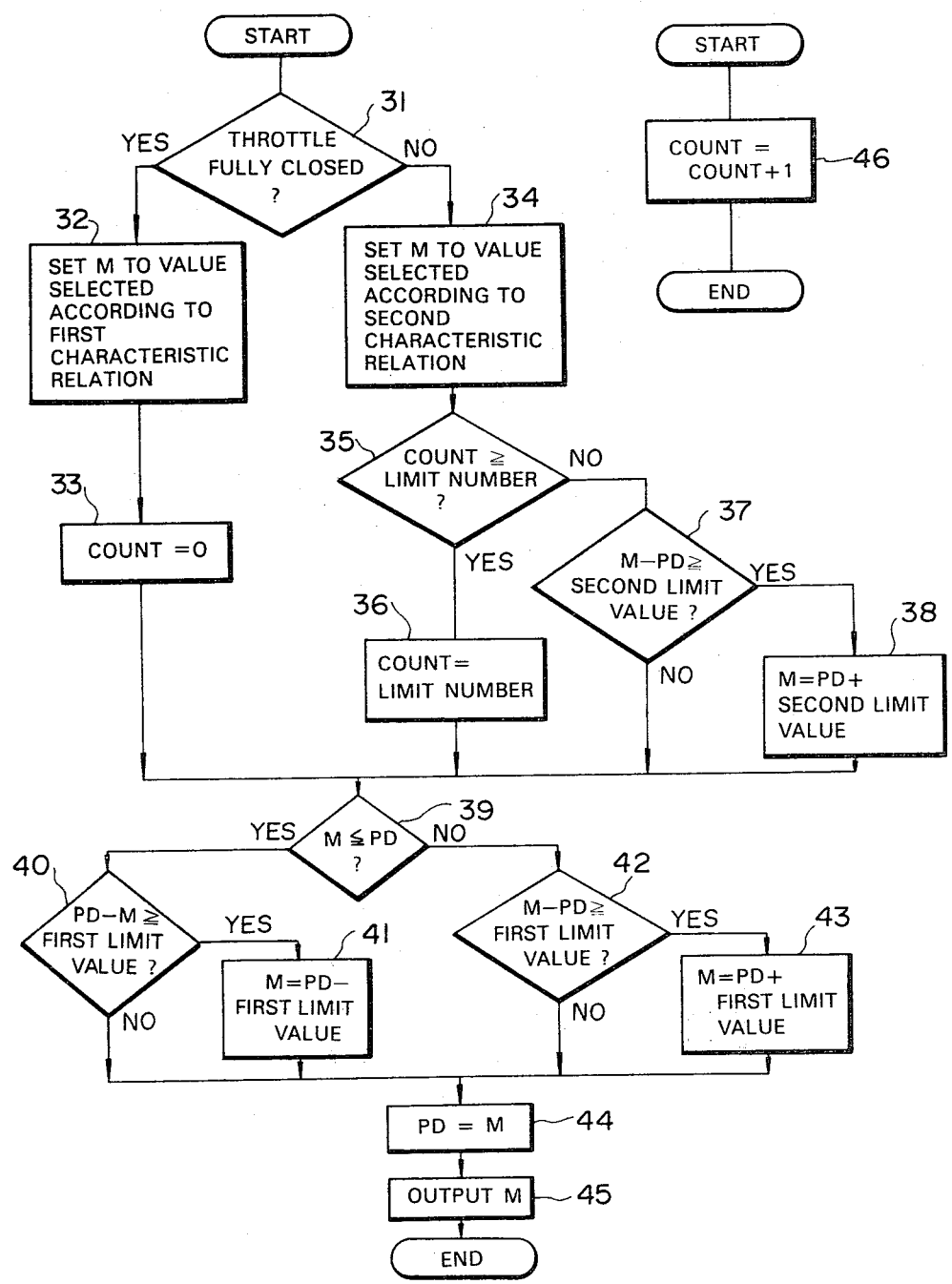
FIGS. 4 and 5 are flowcharts showing the operations of the present invention.

The operations of the processing section 21 is shown in the flowchart of FIG. 4. Referring to FIG. 4, a check is made first at a step 31 to determine whether the throttle valve is fully closed. If so, the ignition timing for a given point of the engine operating conditions is selected at a step 32 according to the first characteristic relation shown in FIG. 2, and the basic value M of this time is set to the thus selected ignition timing. Then, after setting a count of a counter to zero at a step 33, the program goes to a step 39.

If, however, it is determined at step 31 that the throttle valve is not fully closed, then the basic value M is determined as being the ignition timing selected according to the second characteristic relation shown in FIG. 3, at a step 34. At a step 35 following the step 34 it is decided whether the count is equal to or more than a predetermined limit number, to estimate the length of lapsed time since the time the throttle valve is brought to an open state from the fully closed state.

Figure 5:
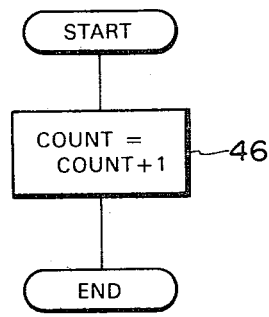

As shown in FIG. 5, the counter is arranged to increase the count by one in each performance of the computer program which is performed periodically, at predetermined time interval, or each time the number of crank shaft rotations reaches a predetermined number. The counter is reset to zero each time the program step 33 is reached. Accordingly, the count is equal to or greater than the predetermined limit number after the lapse of the predetermined time interval or after the end of the predetermined number of crankshaft rotations from a position change of the throttle valve from its fully closed state to its open state. In this case the program goes to the step 39 after setting the count to the predetermined limit number. If enough time does not elapse from a change of the throttle valve from the fully closed state to the open state, and if, therefore, the count is smaller than the predetermined limit number, then, the program goes to a step 37.

At step 37, the present basic value M is compared with a previous value PD of ignition timing to find the difference M−PD, and it is determined whether the difference M−PD is equal to or greater than a second predetermined limit value (1°, for example) corresponding to the second predetermined range. If not, the program goes directly to step 39. If the difference does equal or exceed the second predetermined limit value, the program goes to step 39 through a step 38, where the basic value M is set to the sum of the previous value PD and the second predetermined limit value. With this arrangement, the difference of the present ignition timing from the previous ignition timing in the direction of a spark advance is limited to be less than the second limit value during a predetermined limited time interval or a predetermined number of crankshaft rotations from a position change of the throttle valve from its fully closed state to its open state.

At step 39, it is decided whether the present basic value M is equal to or smaller than the previous value PD. If it is, a further check is made at a step 40 to decide whether PD−M is equal to or greater than a first predetermined limit value (for example, 10°) corresponding to the first predetermined range. If the answer of the step 40 is NO, the program goes directly to a step 44, and, if the answer is YES, the step 44 is reached after M is set to the difference, PD minus the first predetermined limit value, as a step 41.

If the result of the determination at step 39 is NO (the case of a spark advance), a check is made at a step 42 to decide whether M−PD is equal to or greater than the first predetermined limit value. If the result of step 42 is NO, the program goes directly to step 44. If the result of step 42 is YES, the program goes to step 44 through a step 43, where M is set to the sum of the previous value PD and the first predetermined limit value. Thus, the difference in ignition timing between a present time and a previous time in both directions of spark advance and retard is limited by steps 39 to 43 to be less than the first predetermined limit value.

At step 44, the value of M is stored as the value of PD for use in the next operation process and, at a next step 45, M is sent out as the value of ignition timing for the present time.

In the program shown in FIG. 4, the difference between a present ignition timing and a previous ignition timing is limited to be less than the first predetermined limit value both in the directions of a spark advance and a spark retard, so that an abrupt and discontinuous change of ignition timing is prevented. Furthermore, the amount of ignition timing change toward a spark advance is limted to be less than the second predetermined limit value, smaller than the first predetermined limit value, when the position of the throttle valve is changed from its fully closed position to the open position (at a start of acceleration). The method and the system of the present invention can thus provide a smooth increase of engine output torque during acceleration and thus prevent the occurrence of undesired shocks and vibrations which would otherwise result from an abrupt increase of the engine output torque. Optionally the first predetermined limit value may be made different in the steps 40 and 41 and the steps 42 and 43. For example, an engine stall during steep deceleration is prevented by making the first predetermined limit value for the steps 40 and 41 larger than that of the steps 42 and 43, although too large a value of the first limit value results in insufficiency of ignition energy and hence poor ignitability.

Thus, by preventing a violent change of ignition timing resulting from a change of the engine operating conditions, the method and the system of the present invention improve driveability, assure stable operation, and prevent misfire and uncomfortable shock during acceleration due to unstable variation of dwell angle and uncomfortable shock during acceleration.

What is claimed is:

1. A method of controlling ignition timing of an internal combustion engine, said method comprising iterations of the steps of:
    (a) measuring engine operating variables to estimate the engine operating conditions,
    (b) determining an optimal ignition timing, as a basic value, depending on the engine operating variables measured in said measuring step,
    (c) storing an ignition timing, used in a previous iteration of the method, as a previous value,
    (d) comparing said basic value with said previous value to find a difference therebetween,
    (e) determining if said difference is greater than a first predetermined range,
    (f) performing a first limiting step of limiting said basic value, if said difference is beyond said first predetermined range, to a value selected so that said difference is kept within said first predetermined range,
    (g) performing a second limiting step of further limiting said basic value, if said difference is beyond a second predetermined range which is narrower than said first predetermined range, thereby limiting the amount of ignition timing change toward a spark advance in such a manner that said difference is kept within said second predetermined range during a limited time interval from a position change of a throttle valve for the engine from its fully closed position to an open position,
    (h) setting an ignition timing to be used during a present application of the method at said basic value as limited in said first limiting step and in said second limiting step, and
    (i) executing engine ignition in accordance with the ignition timing set in said setting step.

2. A method according to claim 1, wherein said first limiting step comprises the further steps of setting said basic value as being equal to the result of subtracting from said previous value a first limit value defining said first range if said basic value determined in said first mentioned determining step is smaller than said previous value and if the absolute value of said difference is larger than said first limit value, and setting said basic value as being equal to the sum of said previous value and said first limit value if said basic value is larger than said previous value and if the absolute value of said difference is larger than said first limit value.

3. A method according to claim 2, wherein said measuring step comprises the step of detecting the fully closed position of the throttle valve of the engine, wherein said first mentioned determining step comprises the step of further determining said basic value according to a first predetermined characteristic relation between the ignition timing and the engine operating variables when the throttle valve is in its fully closed position and according to a second predetermined characteristic relation between the ignition timing and the engine operating variables when the throttle valve is away from its fully closed position.

4. A method according to claim 3, wherein said second limiting step is accomplished by setting said basic value as being equal to the sum of said previous value and a second limit value defining said second predetermined range if said basic value is larger than said previous value and if the absolute value of said difference is larger than said second limit value.

5. A method according to claim 4, wherein said first limit value is 10 degrees and said second limit value is 1 degree.

6. A method according to claim 4, wherein said limited time interval used in said second limiting step is a time required for a predetermined number of crankshaft rotations.

7. A method according to claim 4, wherein said second limiting step comprises a substep of measuring said limited time interval by increasing a count by one in every repetition of said setting step, resetting said count to zero each time it is detected that the throttle valve is in its fully closed position, and checking to determine whether said count is larger than a predetermined limit number.

8. A method according to claim 4, wherein said first limit value is a first set value when said basic value is smaller than said previous value and a second set value when said basic value is larger than said previous value.

9. A method according to claim 8, wherein said first set value is larger than said second set value.

10. A method according to claim 4, wherein said step of measuring engine operating variables comprises the steps of measuring engine rotational speed and engine load.

11. A system for controlling ignition timing for an internal combustion engine, said system comprising:

(a) a plurality of sensors for measuring engine operating variables to estimate engine operating conditions, (b) an electronic control unit arranged to receive output signals from said sensors and to determine the ignition timing depending on the engine operating conditions, said control unit comprising:

means for determining an optimal ignition timing, as a basic value, depending on the engine operating variables measured by said sensors, means for storing an ignition timing, used in a previous operation of the control unit, as a previous value, means for comparing said basic value with said previous value to find a difference therebetween, first limiting means for limiting said basic value, if said difference is beyond a first predetermined range, to limit the amount of ignition timing change in such a manner that said difference is kept within said first predetermined range, second limiting means for limiting said basic value, if said difference is beyond a second predetermined range which is narrower than said first predetermined range, thereby to limit the amount of ignition timing change toward a spark advance in such a manner that said difference is kept within said second predetermined range during a limited time interval from a position change of a throttle valve for the engine from its fully closed position to its open position, and means for setting an ignition timing to be used during a present operation of the control unit at said basic value as limited by said first and second limiting means, and (c) an ignition executing sustem for executing engine ignition in accordance with the ignition timing set by said control unit.

* * * * *